Mar. 5, 1929.　　　　H. G. KELLOGG　　　　1,703,939

FINISH STRIP ASSEMBLY

Filed May 2, 1927

Inventor

Homer G. Kellogg

By Whittemore Hulbert
Whittemore & Belknap

Attorneys

Patented Mar. 5, 1929.

1,703,939

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

FINISH-STRIP ASSEMBLY.

Application filed May 2, 1927. Serial No. 188,239.

This invention relates to a finish strip assembly and has as its objects to simplify, render more efficient and improve generally devices of this character.

More specifically, the invention contemplates a finish strip assembly including an anchorage strip or member and a molding strip adapted for snap engagement and to embrace the anchorage strip. The invention also contemplates fashioning the molding strip to provide a drip trough and to develop this molding strip from a single strip of material.

Figure 1:
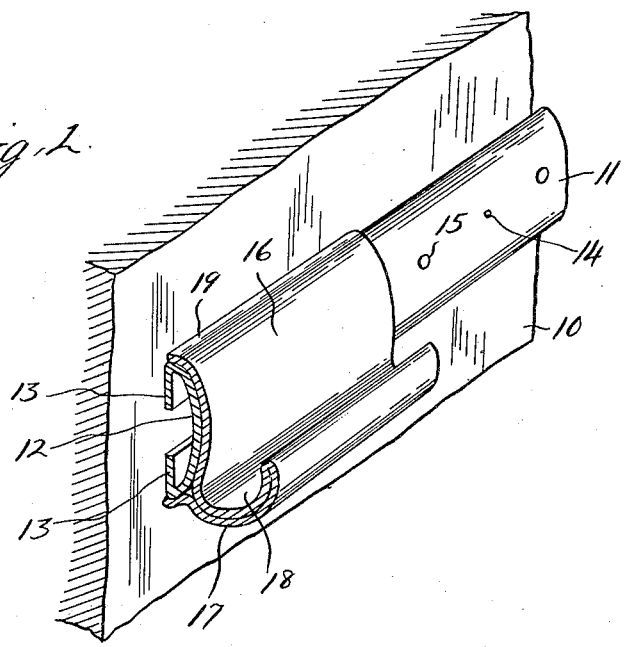
Figure 2:
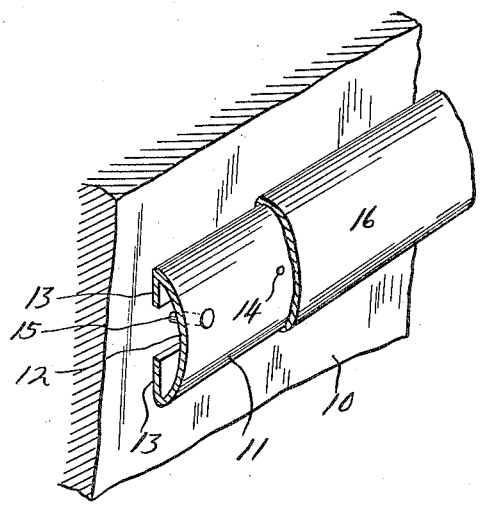

The several objects, advantages and novel details of this invention will be made more apparent as this description proceeds, especially when considered in connection with the accompanying drawings wherein:

Figure 1 is a fragmentary perspective view of a finish strip assembly constructed in accordance with this invention, and Figure 2 is a similar view showing a different form of molding strip.

Referring now particularly to the drawings wherein like reference characters indicate like parts, it will be noted that there is illustrated a support 10 which obviously may be at any portion of the frame or body of the motor vehicle to which this finish strip assembly is to be attached. Secured to the support 10 is an anchorage strip 11 formed with a semi-circular, curved or bowed body portion 12 terminating in angularly bent flanges or edge portions 13 constituting support engaging portions. The body 13 may be provided with a plurality of longitudinally spaced apertures 14 through each or selected ones of which securing elements 15 may be passed into the support 10.

The reference character 16 indicates generally the molding strip which is developed from a single strip of material the intermediate portion of which is bent upon itself as shown at 17 forming a portion of double wall thickness which is shaped to form a drip trough 18. The edges of the molding strip are then bent to form opposed inwardly extending open return bent portions 19 which are adapted and capable of snap engagement with the edges of the anchorage strip 11. The molding strip 16 is snapped into engagement with the anchorage strip by pressing the molding strip thereagainst as will be obvious and when in place the molding strip lies and is arranged contiguous to the anchorage strip and concealing and covering the apertures 14 and securing elements 15. By forming the trough 18 from the double wall portion 17 it is not only possible to develop the molding strip 16 from a single strip of material but the double wall portion 17 affords additional strength and rigidity which prevents the denting or other distortion of the drip trough.

In Figure 2 the molding strip 16 is shown of a slightly different form in that no drip trough 18 is provided but obviously this molding strip may be snapped into engagement with the anchorage strip in the same manner as previously described and when in place conceals and covers the apertures 14 and securing elements 15.

While an embodiment of the invention has been described herein somewhat in detail it will be readily apparent to those skilled in this art that various changes in the specific form of construction illustrated may be resorted to without departing from the spirit and scope of this invention and to this end reservation is made to make such changes as may come within the purview of the accompanying claims.

What I claim as my invention is:

1. In a drip and trim rail assembly, an inner continuous anchorage strip and an outer drip rail or molding of similar length developed from a single strip of material bent upon itself intermediate its edges to form a double wall with this double wall portion shaped to form a trough and the edges of said strip bent to form opposed return bent portions adapted for snap-on engagement over said anchorage strip to enclose and conceal the latter.

2. A finish strip assembly including an anchorage strip having an intermediate curved body portion and straight inturned edge portions adapted for engagement with a support and providing shoulder portions, and a drip molding strip having an intermediate portion bent upon itself and shaped to form a trough and adjacent portions bent to conform to the curved body portion of the anchorage strip, the edges of said adjacent portions being inturned and adapted for snap engagement over the shoulder portions of said anchorage strip.

In testimony whereof I affix my signature.

HOMER G. KELLOGG.